United States Patent [19]

Jack et al.

[11] 3,989,775

[45] Nov. 2, 1976

[54] METHOD OF MAKING A RETRO-REFLECTIVE BEADED MATERIAL

[75] Inventors: James Jack, Manningtree; Terence John Taylor-Brown, Ipswich, both of England

[73] Assignee: Bakelite Xylonite Limited, London, England

[22] Filed: Nov. 20, 1973

[21] Appl. No.: 417,578

Related U.S. Application Data

[63] Continuation of Ser. No. 229,461, Feb. 25, 1972, abandoned.

[30] Foreign Application Priority Data

Mar. 1, 1971 United Kingdom................ 5658/71

[52] U.S. Cl.................................. 264/1; 264/112; 264/119; 264/128; 264/131; 264/134; 264/139; 264/266; 264/271; 264/293; 264/299; 264/331

[51] Int. Cl.²...................... B29D 3/00; B29D 9/10; B29D 11/00

[58] Field of Search ............... 264/1, 119, 132, 131, 264/134, 241, 245, 284, 2, 139, 129, 250, 255, 271, 293, 331, 112, 128, 259, 266, 299; 161/1–5

[56] References Cited

UNITED STATES PATENTS

| 2,378,252 | 6/1945 | Staehle et al. ........................... 264/1 |
| 3,065,559 | 11/1962 | McKenzie ............................... 161/4 |
| 3,176,584 | 4/1965 | De Vries et al. ......................... 161/4 |
| 3,702,213 | 11/1972 | Schwab .................................. 264/1 |

*Primary Examiner*—Willard E. Hoag
*Attorney, Agent, or Firm*—Brisebois & Kruger

[57] ABSTRACT

Method of making a beaded retro-reflective material comprising embedding beads in a generally planar plastic matrix and embossing the material so that axes of exposed portions of the beads lie at varying angles to the general plane of the matrix.

21 Claims, 7 Drawing Figures

5 cm 5 cm 5 cm

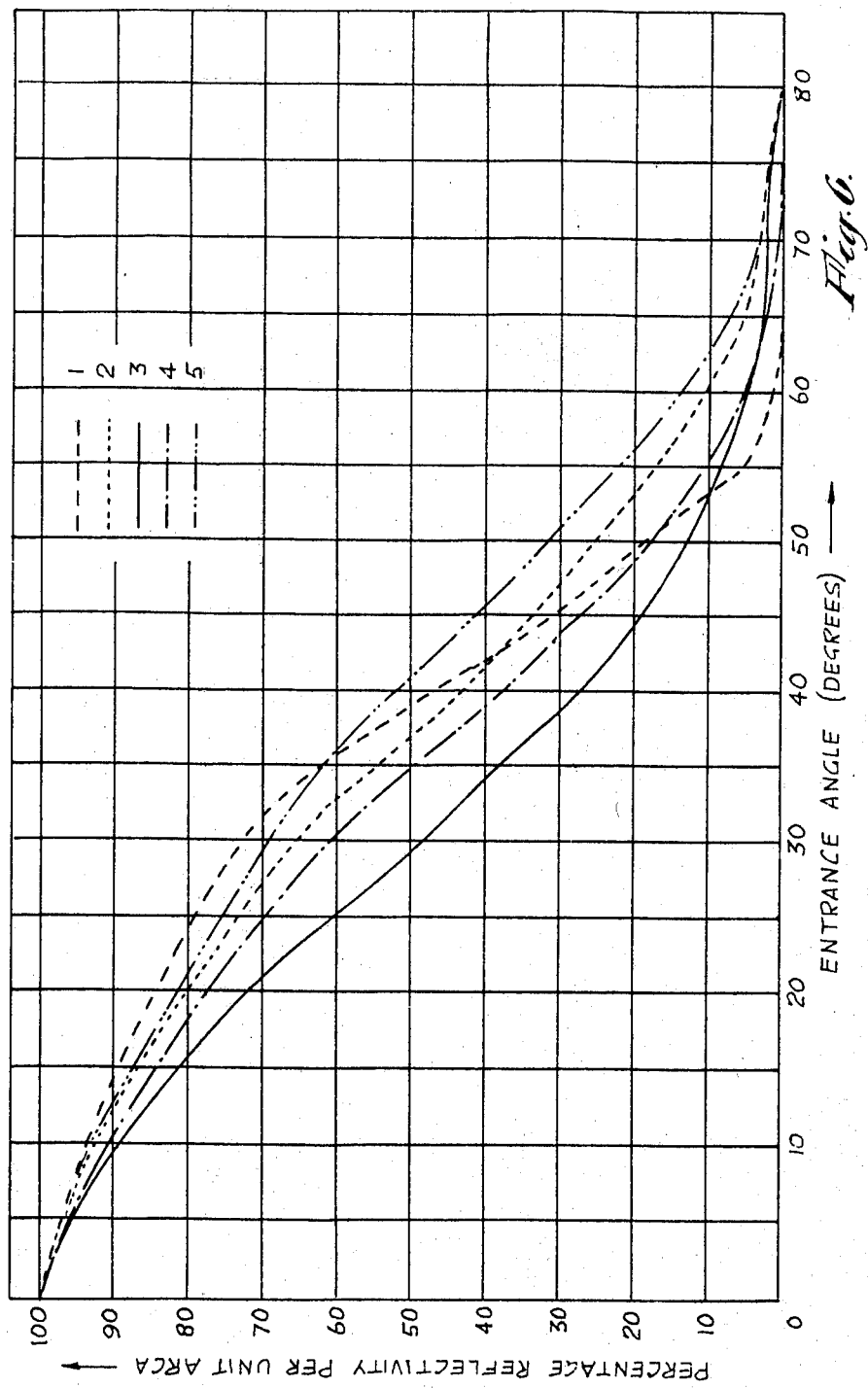

METHOD OF MAKING A RETRO-REFLECTIVE BEADED MATERIAL

This is a continuation of application Ser. No. 229,461, fild Feb. 25, 1972, and now abandoned.

This invention relates to a retro-reflective material and to a process for its manufacture. In particular, the invention relates to a retro-reflective material having improved retro-reflective properties for light incident at a large angle to a normal to the plane of the surface of the material and to a process for its manufacture.

According to one aspect of the present invention there is provided a retro-reflective material comprising a plurality of substantially spherical beads, prepared from a transparent or translucent material having a refractive index in the range 1.7 to 2.0 said beads being distributed over and embedded in an area on the surface of a plastics matrix, said area containing the embedded beads having an embossing superimposed on the beaded surface thereof.

According to a second aspect of the present invention, there is provided a process for the manufacture of a retro-reflective material, which process comprises distributing in a mono-layer, over an area on the surface of a matrix of embossable plastics material, a plurality of substantially spherical beads prepared from a transparent or translucent material having a refractive index in the range of 1.7 to 2.0 to form a beaded area on the surface of the matrix and subjecting said beaded area to the action of a tool or combination of tools so that the beads are embedded in the surface of the matrix and the thus formed bead-containing area has an embossing superimposed thereon.

The expression "retro-reflective" used in this specification means that a beam or ray of light incident on the beaded and embossed area on the surface of the material of the invention is refracted and reflected in such manner that a significant proportion of the incident light is directed substantially back towards the source, in a cone or wedge having a small apex angle, even when the light strikes that area at an angle to the normal.

The beads employed in the material and process of the present invention may be of any transparent or translucent material or combination of materials but the beads should be such that they do not become undesirably deformed or damaged during the production of the retro-reflective material. Certain inorganic glasses may be mentioned as suitable materials for the beads. Conveniently, the glass beads known as Ballotini beads may be employed in the material and process of the invention. When the aesthetic appearance of the material of the invention is important, the bead diameter is preferably no greater than 0.03 inch, since for greater diameters the day-time appearance of the material of the invention is not good. For such applications the bead diameters are most preferably no greater than 0.006 inch.

The refractive index of the material of the beads should be in the range 1.7 to 2.0 and preferably in the region of 1.9. A refractive index in the region of 1.9 is preferred because the focus of the lens comprising a substantially spherical bead then falls at, or very near, the back surface of the bead. This means of course that the maximum amount of a beam of light incident on the front surface of such a bead and reflected at the back surface after refraction will be directed back substantially along the same path. It will be appreciated that when the refractive index of the material of the beads deviates from 1.9 the apex angle of the cone of retro-reflected light deviates from the minimum. For an acceptable apex angle to be obtained with the material of this invention the refractive index of the material of the beads must be in the stated range of 1.7 to 2.0. The ideal apex angle is of the order of 10° but the apex angle will normally be somewhat larger.

Although it is not essential, it is preferred that in the material of the present invention the portion of the surface of at least some of the beads, distributed over and embedded in an area on the surface of the plastics matrix, and enclosed by the plastics matrix should be in contact with a reflective layer. In this way, a higher proportion of the light refracted on entering the beads may be reflected at the back surface of the beads. The reflective layer may comprise part of an overall integral surface layer of the plastics matrix or part of a separately applied overall coating on the surface of the plastics matrix or may be a layer which is present only at the interface of a bead and the plastics matrix. The latter is preferred and in the process of the present invention it is therefore preferred to coat at least some of the beads with a reflective layer before distributing them over the area on the surface of the plastics matrix. Since, in the material of this invention, light should be able to enter the beads, in the preferred process of this invention, after embedding the reflective-coated beads and preferably after embossing the bead-containing area the reflective layer should be removed from the exposed portions of the beads. Thus a retro-reflective material according to this invention may be prepared wherein beads are individually backed with a reflective layer.

Any light reflecting material may be employed in the reflective layer, for example gold, silver and aluminium which, for example, may be dispersed in lacquers, vacuum deposited aluminium and other metals, and materials containing white pigments and/or fillers such as titanium dioxide and barium sulphate. The nature of the reflective layer may of course be dictated by the efficiency of retro-reflectivity desired in the material of this invention and the method by means of which it is to be produced. When the reflective layer comprises a coating on the surface of the beads it preferably comprises silver which has been deposited on to the surface of the beads, for example, by chemical means.

In the preferred process the removal of a reflective layer from the exposed portion of a bead may be effected by any suitable method which will not deleteriously affect the area of the reflective layer between the bead itself and the plastics matrix. Methods involving abrasion and solution are exemplary of those which might be employed. When the reflective layer comprises silver for example, this may be removed effectively by treatment with acid solution such as chromic acid or nitric acid.

The plastics matrix may comprise any embossable thermoplastic or thermosetting plastics material or mixture of thermoplastic or thermosetting plastics material. Thermosetting resins will normally be embossed before final curing is effected. Examples of thermosetting resins include unsaturated polyester resins, epoxy resins and phenol formaldehyde resin and also polyurethane precursors. Thermoplastics are preferred, however, because of the ease with which these materials may be embossed and the range of flexibilities that is available. Examples of thermoplastics include rigid and flexible polyvinyl chloride, polystyrene, acrylonitrile-butadiene-styrene polymers, polymethyl-methacrylate, polyamides, polycarbonates, thermoplastic polyurethanes, polyethylene terephthalate, polyethylene and polypropylene. Of these, flexible polyvinyl chloride is most preferred since this material is not only easily embossed in continuous manner but it may be plasticized with, for example, dioctyl phthalate and other well known plasticizers, to give a material having drape properties that make it suitable for use in the manufacture of garments.

The plastics matrix may be transparent, translucent or opaque. Accordingly, the thermoplastic or thermosetting resin of the matrix may contain colouring agents such as pigments and dyes. The resin may also contain additives such as processing aids, plasticizers, lubricants and stabilizers.

It will be appreciated that the plastics matrix may be laminated to or coated on a substrate of the same or other plastics material or a different material and that in the process of the invention such lamination may be effected before, during or after the beading and embossing step.

In the material of the present invention the beads may be embedded to any degree, providing at least a small proportion of the surface area of each bead required to be retro-reflective remains directly accessible to light. Each bead is preferably embedded to a depth at least slightly greater than its radius such that it may be mechanically held in the plastics matrix as well as adhesively held. In some instances the whole of the bead may be below the surface of the matrix but a window being left above the bead allowing direct access for light to reach the bead. This arrangement is particularly desirable if, for example, the beads are to be protected against abrasion.

The term "embedded in" used in this specification to mean that at least a part of each bead lies in a depression formed by the bead in the matrix.

The mono-layer of beads may be a continuous or noncontinuous layer of beads which may contain any number of beads up to the maximum, which, in the case of beads of substantially equal diameter, corresponds to the beads being in hexagonally close-packed array. When the beads are in hexagonally close-packed array they are at their maximum bead-density. For the purpose of this specification bead-density is defined as the average number of beads per square millimeter of matrix surface prior to embedding and embossing, over the area under consideration.

The beaded and embossed area may constitute the whole or only part of the total area of the surface of the plastics matrix that is to be accessible to light when the material is in normal use. When the beaded and embossed area is only part of the total area it may comprise part of an overall sign, design or pattern. In such cases the sum of the beaded and embossed areas on the surface preferably constitutes 5 to 95 percent of the total area of the surface. Below 5 percent the retro-reflective effect of the surface is insignificant and above 95 percent the surface is insignificantly distinguishable from an overall beaded surface.

When the beaded, embossed area comprises only part of the total area of the surface of the matrix, the bead density is preferably high and most preferably is in the region of the maximum. When the beaded, embossed area comprises the total area of the surface of the matrix, the bead-density may also be up to the maximum but if substantially all the beads are individually backed with an opaque reflective layer and thus individually mask the surface of the plastics matrix from day-time view the bead density is preferably less than the maximum for a mono-layer for a particular average bead diameter. In all cases, however, it is preferred that the bead-density is at least 2 since below this figure the level of retro-reflectivity in the material of this invention is below an acceptable minimum for most purposes, especially road-safety applications.

When the plastics matrix is transparent or translucent, the bead-density may be up to the maximum but when substantially all the beads are individually backed with an opaque reflective layer it is preferably arranged to be less than the maximum, for example up to 95 percent of the maximum, for a mono-layer for a particular average bead diameter and preferably at least 2 and most preferably in the range of 3 to 14, the maximum being governed of course by the average bead diameter. In this way a degree of light transmission can be retained in the retro-reflective material of this invention making it partially transparent or translucent by day and retro-reflective at night. Applications for such a material include rainwear, covers for obstructions the details of which are to be seen by day but the overall obstruction must be seen easily at night. An example of an obstruction is a painted road cone having a white middle section and fluorescent red upper and lower sections. If such a road cone is covered with a sleeve of the above-mentioned partially transparent retro-reflective material such that the retro-reflective surface is outermost, the red and white sections of the cone may be seen by day and at night, providing the bead-density is not too low and the observer is not standing too near, the whole cone appears to emit a retro-reflected silver glow when illuminated by a beam of light. Thus the whole cone becomes clearly visible at night when illuminated by a beam of light. Without the sleeve, only the white portion of the cone is at all visible under night-time conditions.

It will be appreciated that when the matrix comprises a transparent or translucent plastics material it may be laminated to a plain substrate or bear a printed, coated or laminated sign, pattern or design on the back side or sides accessible to light through the beaded surface. It will be appreciated that a transparent or translucent plastics matrix may bear a printed, coated or laminated sign, pattern or design on either surface and the beaded and embossed area may extend over the whole or only part of the front surface. When the beaded and embossed area extends over the whole surface, the bead density may be such that by day the sign, pattern or design can be seen together with what is behind the transparent or translucent matrix but under night-time illumination only an overall retro-reflective glow is seen. For this purpose when substantially all the beads are individually backed with an opaque reflective layer 24 the bead-density is preferably no greater than 95 percent of the maximum for a mono-layer for a particular bead-diameter and preferably at least 2 and most preferably in the range of 3 to 14, the maximum bead-density being governed by the average bead-diameter. When the beaded, and embossed area extends over only a part of the surface of the plastics matrix it can of course be arranged that said area corresponds to a part of a sign, design or pattern so that that part of the sign, design or pattern can be seen under night-time illumination. In order to obtain high retro-reflected intensity from a relatively small area it may be desirable to arrange for the bead-density to be in the range 20 to 100 percent of the maximum for a mono-layer for a particular average bead-diameter but a maximum day-time transparency or translucency required may dictate an upper limit.

When the plastics matrix is opaque the bead-density may be anywhere in the range of 2 to the maximum for a mono-layer for a particular average bead-diameter. However, as with the previous cases when the beaded and embossed area extends over the whole surface of the matrix the bead-density may be up to the maximum but it is often desirable to obtain a differential between the day-time and night-time appearance of the retro-reflective material of the invention and when substantially all the beads are individually backed with an opaque reflective layer it is then arranged for the bead-density for the beaded, embossed area to be less than the maximum, for example up to 95 percent of the maximum, for a mono-layer for a particular bead-diameter and preferably at least 2 and most preferably in the range 3 to 14, the maximum bead-density being governed by the average bead-diameter. Also, in all cases comparable with those described for a transparent or translucent matrix, when the beaded and embossed area extends over only part of the surface of an opaque matrix, it is often desirable to arrange for the bead-density in that area to be relatively high, for example, 20 to 100 percent of the maximum for a particular average bead-diameter in a mono-layer.

As in the case of the transparent or translucent plastics matrix the opaque matrix may bear a printed, coated or laminated sign, pattern or design on its surface and the beaded and embossed area may extend over the whole or only part of the surface.

It will be appreciated that a desired retro-reflective effect may be achieved by over-printing or masking portions of the bead-containing area. For example, the whole surface of a plastics matrix may be beaded to a high bead-density. This bead-containing surface may then be over-printed with an open design or pattern to reduce the retro-reflecting area of that surface.

To protect the beaded and embossed surface of the retro-reflective material of this invention from the deleterious action of dirt and weather, for example, a transparent or translucent overlay may be arranged to shield the beaded and embossed surface but, so that the retro-reflective properties of the material of this invention may not be impaired too much, the overlay should preferably not contact more than 50 percent of the beads at least when it is desired to take advantage of the retro-reflective properties. The reason for this is that the presence of an overlay in contact with a bead would alter the relative refractive index of the bead which in turn would alter the position of the focus relative to the back surface of the bead and thus alter the retro-reflective properties of that bead.

Another means of protecting the beaded and embossed surface is to apply a transparent or translucent coating or layer which is sufficiently thin to enable it to conform throughout its thickness to a substantial proportion of the exposed surface of each bead. The thickness of any such coating or layer should not be sufficient to affect the position of the focus of any one bead such that the retro-reflective properties of the material of the invention are affected to an undesirable extent.

It will be appreciated that any protective overlay, coating or layer may be coloured such that the incident and retro-reflected light is filtered during passage therethrough. Such filtering may be complementary to that which may be effected by the beads themselves which may be coloured throughout or bear a complete or partial colouring layer.

The embossing which is superimposed on the bead-containing area may be any superficial or through-embossing which is such that the surface of the beaded area embossed is disturbed as shown at 22 in FIG. 7 so that the axes 25 of at least some of the lenses defined by the exposed portions 23 of the beads are not perpendicular to the plane of the plastics matrix 21. The embossing is preferably such that the relative intensity of retro-reflected light when the beaded and embossed area is illuminated with a parallel beam of light incident at some angle in the range of 35° to 80° to the normal to the plane of that area, expressed as a percentage of the intensity of the retro-reflected light when the incident light is normal to the plane of the said embossed area is increased compared with the relative intensity obtained in the same way for a similar retro-reflective material prepared using the same plastics matrix material but for which the area on the surface containing embedded beads has no superimposed embossing. The angle of incidence at which the increase in relative intensity first becomes apparent varies for different embossings both as regards depth and pattern. The embossing should be such that on increasing the angle of incidence an increase in the relative intensity is apparent at some angle in the range 35° to 80° and preferably in the range 53° to 80°.

In carrying out the process of the invention the distribution of the beads over an area on the surface of the plastics matrix may be achieved in many different ways. For example, one preferred method comprises spraying the said area with a solvent, which will tackify the surface of the matrix, and subsequently spraying with dry beads suspended in air, for a period of time sufficient to obtain the required bead-density on the said area. The beads stick to the tackified surface which is subsequently dried. Thus the beads may be held in position to facilitate further handling of the beaded matrix in subsequent stages of the process. If the matrix has an inherently tacky surface as might be the case, if for example, it comprises an unsaturated polyester resin the beads may be sprayed on dry, air being the suspension medium. Alternatively the beads may be dropped on to the area in suitably controlled manner, for example, through a screen or grid. Where the surface of the matrix comprises a thermoplastics material the beads may be, for example, dropped or sprayed on in the dry condition but heated to a temperature such that on contacting the surface, the surface is softened sufficiently to form a bond between the surface and the beads. The surface may of course be rendered tacky by the application of, for example, a thin film of pressure-sensitive adhesive. The beads may also be applied by making use of electrostatic forces by generating a charge of one sign on the matrix and a charge of opposite sign on the beads whereupon the beads are attracted to the matrix. Depending on the degree of tenacity required and the conditions, the use of electrostatic forces alone may be sufficient to hold the beads in position and the conjoint use of an adhesive may therefore be unnecessary. The beads may be deposited on to a selected area using a printing technique. One such method employs an engraved roller into the engraved portions of which are deposited beads which can be subsequently redeposited, in register with the engraved portions on to the surface of the plastics matrix. Another method involves printing on adhesive, for example, as a pattern of dots on the surface of the matrix so that on applying an excess of beads only those areas bearing the adhesive retain any beads. When the plastics matrix is derived from a cast resin, resin precursor or plastisol for example, instead of distributing the beads over a surface of the resin, pre-cured or pre-gelled or partially cured or gelled resin matrix, the beads may be first distributed over the surface of a temporary releasable adhesive coated carrier web or belt for example, and the resin, resin precursor or plastisol cast over them whereupon the resin is subsequently set by cooling, curing or gelling as appropriate. The plastics matrix containing the beads embedded in one surface may then be stripped from the carrier and the beaded surface embossed subsequently. Alternatively, the beaded surface may be embossed while in contact with the carrier web or belt by distorting the carrier web or belt before, during or after causing the cast resin for example, to set or indeed by employing a carrier web or belt for example which has, at some time before the resin for example is applied, been embossed, etched or engraved for example. It will be appreciated that a large number of techniques are applicable to the distribution on and, if necessary the adhesion of the beads to, the surface of the plastics matrix and the foregoing are only examplary of some of the techniques which may be used either alone or in combination with one another as exemplified or in any other combination. To improve the bonding of the beads to the plastics matrix at any stage of the process, coupling agents may be employed. An example of a coupling agent which may be used in the process of this invention is N - bis (beta-hydroxyethyl) gamma amino-propyl-triethoxy silane. Such agents may be applied to the beads prior to their application to the plastics matrix, even if they already bear a reflective coating.

The tool or combination of tools which may be employed in the process of the present invention may comprise any tool which will, under the appropriate conditions, cause the beads to become embedded in the matrix and cause the thus formed bead-containing matrix surface to have an embossing superimposed thereon. The tool may be for example an embossing roller, embossing platen or plate which may be applied to the surface of the plastics matrix with the aid of pressure. The nature of the plastics material of the surface of the matrix and the nature of the embossing besides the type of tool employed will all dictate the conditions of temperature, pressure and duration for which the embossing stage in the process of the present invention should be carried out.

It will be appreciated that the tool used to cause the beads to become embedded in the matrix need not necessarily be the same tool that causes the bead-containing area to have an embossing superimposed thereon but consistent with the normal desire to minimize the number of stages in any process, it is preferred that both embedding and embossing are effected simultaneously using one tool. However, where embedding and embossing are consecutive the embedding may be effected using, for example, a plain tool such as a plain roller applied under suitable conditions of pressure and temperature. It will be appreciated also that the tool used in the embedding process might also be used to distribute the beads on the surface of the plastics matrix, such a tool might, for example, be an offset printing roller or a gravure printing roller.

After embossing the surface of the plastics matrix the embossed surface will, of course, be rendered relatively stable, by, for example, curing the thermosetting resin or cooling the thermoplastic resin comprising the said surface.

The following Examples illustrate the invention. In these Examples reference is made to the drawings accompanying this specification in which:

FIGS. 1, 2 and 3 are representations of the embossing patterns employed in Examples 2, 3 and 4 respectively.

The corresponding embossing tools used of course bear engravings which are negatives of the patterns illustrated. The dark areas therefore correspond to the high spots on the embossing tools.

FIG. 6 shows the curves obtained by plotting the results of relative intensity measurements for the retro-reflective materials prepared in Examples 1 to 5.

EXAMPLE 1

Figure 1:
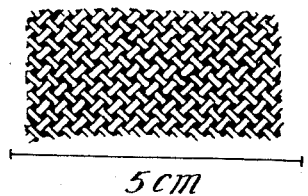

This Example describes the preparation of a reference sample of beaded but unembossed plastics material.

A 0.015 inch thick sheet of black, plasticized p.v.c. having the following formulation was used as starting material:

|  | Parts by weight |
|---|---|
| Breon 125/10 p.v.c. (British Geon Ltd.) | 100 |
| Bisoflex 791 (B.P. Chemicals U.K. Ltd.) | 48 |
| White lead paste | 3 |
| Lead stearate | ½ |
| Carbon black | 1 |

An area on one major surface of the p.v.c. sheet was lightly sprayed with cyclohexanone. The sheet was then allowed to stand until the selected area became tacky.

Ballotini beads Grade T 5, Ballotini Manufacturing Co. Ltd., and having the following specification:

| Refractive index: | 1.9 |
|---|---|
| Bead diameter: | >0.0035 inch - nil |
|  | >0.0029 inch - 0 to 10% |
|  | >0.0015 inch - 90 to 100% |
|  | <0.0015 inch - 0 to 10% | were silvered using the following technique:

Approximately 500 parts by weight of beads were added to a solution of 20 parts of silver nitrate in 2,500 parts of water which had been treated with about 10% ammonium hydroxide solution until the precipitate initially formed was almost re-dissolved. About 17 parts of dextrose in 55 parts of water were then added to the mix followed immediately by 10 parts of a previously prepared solution of 10 parts of potassium hydroxide in 200 parts of water. The mix was stirred for 5 minutes after which time the remainder of the potassium hydroxide solution was added and the stirring was continued for 10 minutes. After this time the aqueous solution was removed from the beads which were washed several times with fresh water and finally air dried at 150° C.

The silvered Ballotini beads thus prepared were then air-sprayed on to the surface of the sheet until the average number of beads distributed over and adhering to the tackified surface was approximately $6.46 \times 10^6$ per square meter which corresponds to a bead-density of 6.46. The major proportion of the cyclohexanone was then removed from the area on the sheet by subjecting it to a current of warm air until it was no longer tacky. The sheet was then placed between a pair of flat polishing plates and the assembly inserted into a press where it was subjected to the following conditions:

i. At contact pressure the temperature of the assembly was raised from room temperature to 120° C, the time taken being 3 minutes.

ii. Pressure increased to 100 p.s.i. and the assembly then cooled from 120° C to room temperature, the cooling cycle taking 4½ minutes.

After removing the sheet from the press, the exposed surfaces of the beads were de-silvered by immersing the sheet for 30 seconds in a chromic acid solution prepared from 25 parts of potassium dichromate, 92 parts of concentrated sulphuric acid and 3000 parts of water, all parts being by weight. On removing the sheet from the chromic acid solution it was thoroughly rinsed with water and dried.

The bead density was determined using the following technique:

The beaded sheet, before embedding and embossing was effected, was mounted such that the beaded area was in the field of view of a travelling microscope having a X10 magnification. A graticule comprising 100 squares each of side 0.0268 inch was inserted into the microscope and the microscope adjusted so that no parallax was evident between the image of the sheet and the image of the graticule.

The number of beads appearing in each square of the graticule was counted and the total number of beads within the graticule thus obtained. This procedure was repeated at one inch intervals along and across the beaded area over a six inch square and the total number of beads in thirty-six graticule areas obtained and from this total the number of beads per square meter was calculated.

Examples 2, 3, 4 and 5 describe the preparation of embossed retro-reflective materials according to the invention for comparison with the reference sample of Example 1.

EXAMPLE 2

The procedure of Example 1 was repeated except for the following:

1. The number of applied beads per square meter was approximately $9.10 \times 10^6$ corresponding to a bead density of 9.1.

2. The top polishing plate of the assembly was replaced by an embossing plate engraved with a negative of the pattern illustrated in FIG. 1. The maximum depth of the engraving was 0.007 inch.

3. The pressure applied during the cooling cycle of the pressing operation was 150 p.s.i.

EXAMPLE 3

The procedure of Example 2 was repeated except for the following:

1. The number of applied beads per square meter was $7.52 \times 10^6$ corresponding to a bead-density of 7.52.

Figure 2:
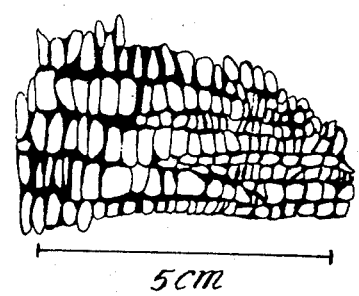

2. The embossing plate was replaced by an embossing plate engraved with a negative of the pattern illustrated in FIG. 2. The maximum depth of the engraving was 0.003 inch.

EXAMPLE 4

The procedure of Example 2 was repeated except for the following:

1. The number of applied beads per square meter was $6.86 \times 10^6$ corresponding to a bead-density of 6.86.

Figure 3:
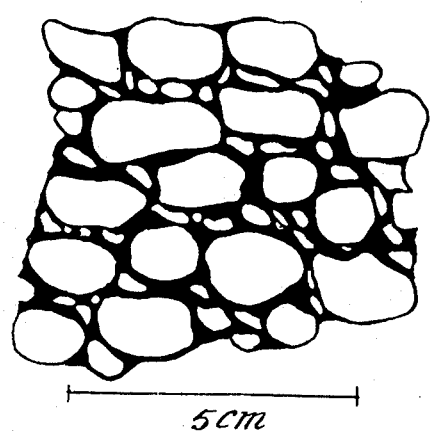

2. The embossing plate was replaced by an embossing plate engraved with a negative of the pattern illustrated in FIG. 3. The maximum depth of the engraving was 0.003 inch.

EXAMPLE 5

The procedure of Example 2 was repeated except for the following:

1. The number of applied beads was $10.4 \times 10^6$ per square meter corresponding to a bead-density of 10.4.

2. The embossing plate was replaced by an embossing plate engraved with a negative of a pattern of similar design to that illustrated in FIG. 1 but of finer structure thus having an even greater surface area. The maximum depth of the engraving was 0.003 inch.

Specimens of equal area were then cut, one from each of the beaded pressed and de-silvered portions of the samples prepared in Examples 1 to 5 and were then subjected to the following test procedure.

Figure 4:
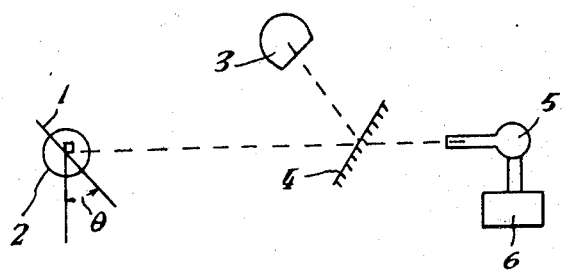
FIGS. 4 and 5 are semi-schematic plan and side elevation views respectively, of the apparatus employed in the Examples to determine the variation of relative intensity of the retro-reflected light with angle of incidence for retro-reflective materials.
Figure 7:
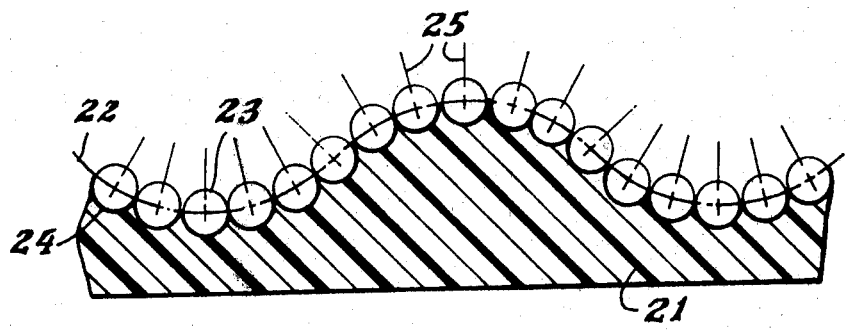
FIG. 7 is a schematic sectional view taken through a beaded retro-reflective sheet according to the invention.
Figure 5:
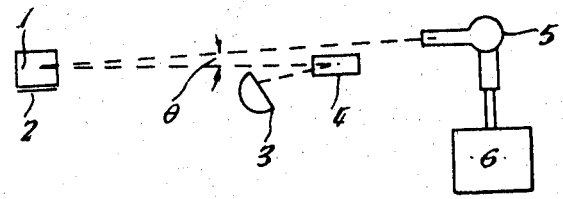

The apparatus illustrated in FIGS. 4 and 5 was set up. In FIGS. 4 and 5, 1 is a specimen which is rotatable about a vertical axis on protractor 2; 3 is a source of a beam of light which, via mirror 4 is directed on to the specimen from which the retro-reflected light is collected by photo-multiplier 5 to which is connected galvanometer 6. The angle $\theta$ corresponds to the angle of incidence of the incident beam and the angle $\phi$ was arranged to be 1.5°.

The reading of the galvanometer for the background was noted. This reading was taken with the lamp on but with no sample present. Taking each of the specimens in turn a specimen was inserted in the specimen holder, which supported the specimen in a substantially planar manner and without distorting the embossing significantly over the area under test, and arranged such that the beaded side faced the photo-multiplier and turned so that the angle $\theta$ was equal to 5°. The galvanometer reading was then taken. The angle $\theta$ was then increased in stages up to 85° galvanometer readings being noted at each stage. These readings were then plotted against $\theta$ and by extrapolating the graph obtained a value was obtained for the galvanometer reading that would be obtained when $\theta = 0°$ in the absence of specular reflective glare. The galvanometer readings were then corrected for the background.

In order to allow for the diminishing projected area of the specimen in the direction of the photo-multiplier when $\theta$ is other than zero, the corrected galvanometer readings were then related to unit area of specimen by multiplying them by secant $\theta$. The figures thus obtained were then each expressed as a percentage of the figure obtained for $\theta$ equal to zero. These final percentage figures which correspond to the relative intensity of the retro-reflected light with the incident light at an angle to the normal of the specimen compared with that when the incident light is normal, were then plotted against the angle of incidence and a curve for each specimen obtained as shown in FIG. 6 wherein the numbers given in the key to the curves correspond to the Example numbers and the respective specimens.

EXAMPLE 6

A 0.015 inch thick sheet of transparent plastic having the following formulation was used as starting material

|  | Parts by weight |
|---|---|
| Breon 125/10 p.v.c. (British Geon Ltd.) | 100 |
| Bisoflex 791 (B.P. Chemicals U.K. Ltd.) | 31 |
| Lankro Stabilizer Mark C (Lankro Chemicals Ltd.) | ½ |
| Lankro stabilizer Mark PL (Lankro Chemicals Ltd | ⅛ |
| Cadmium stearate | ¼ |
| Barium stearate | ½ |

The whole of one major surface of this sheet was tackified, beaded, pressed and de-silvered in the same way as the beaded, pressed and de-silvered area prepared in Example 1. The whole of one major surface of a similar sheet was tackified beaded and embossed in the same way as the beaded and embossed area prepared in Example 2. The thus prepared sheets were each made into frustoconical-shaped sleeves which were each passed over fluorescent red and white painted road cones such that the beaded surfaces were outermost. In daytime the red and white areas of the cones were clearly visible through the sleeves and at night, when illuminated with a beam of light, both sleeves gave an overall retro-reflected silver glow over both the red and white areas, however a greater proportion of the curved surface of the embossed sleeve could be clearly seen.

It will be appreciated that when the beads are not individually backed with an opaque reflective layer the plastics matrix or any reflective coating thereon may not only be visible between the beads but will be visible through the beads, consequently to obtain a differential between the daytime and night-time appearance of a retro-reflective material it is not always necessary to limit the bead-density to less than the maximum for a mono-layer for a particular bead-diameter. When uncoated beads are employed for example, the bead-density may be that maximum as illustrated in the following Examples 7 and 8.

EXAMPLE 7

The procedure of Example 6 was repeated except that throughout, Ballotini Grade T 5 beads as specified in Example 1 but unsilvered were used, in consequence of which the de-silvering of that Example was omitted, also the beading was continued until a substantially complete mono-layer of beads (i.e. maximum bead-density) was obtained.

The products were examined as in Example 6. In daytime, the red and white areas of the cones were clearly visible through the sleeves and at night when illuminated with a beam of light, both sleeves gave an overall retro-reflective silver glow over both the red and white areas, however, a greater proportion of the curved surface of the embossed sleeve could be clearly seen.

EXAMPLE 8

A 0.015 inch thick sheet of red, flexible p.v.c. having the following formulation was used as starting material:

|  | Parts by weight |
|---|---|
| Breon 125/10 | 100 |
| Bisoflex 791 | 48 |
| White lead paste | 3 |
| Lead stearate | 0.5 |
| Irgalite Red R/C. (Geigy (UK) Ltd.) | 0.4 |

The whole of one major surface of the sheet was tackified by spraying it lightly with cyclohexanone.

Ballotini Grade T 5 beads as specified in Example 1 but unsilvered were then air-sprayed on to the tackified surface until a complete mono-layer (maximum bead-density) was obtained. The major proportion of the cyclohexanone was then removed from the beaded surface by subjecting it to a current of warm air until it was no longer tacky.

The thus prepared beaded sheet was then subjected to the pressing procedure of Example 2.

In daytime the product appeared to be red but under night-time conditions and when illuminated with a beam of light and observed from a distance of 25 feet, a predominantly silver retro-reflective glow was seen, only a slight pink overtone being detectable.

EXAMPLE 9

A fabric-supported flexible p.v.c. material was prepared in the following way:

Natural p.v.c. paste (Grade PCT/60/2761/0000) as supplied by Vinatex Ltd. was applied to the raised side of 5 – 6 oz. cotton fabric (Black 7607), as supplied by Carrington and Dewhurst Ltd., at a coating weight of 70 gms/square meter. The coated fabric was then heated in an oven, having an air temperature of 140° C, for 15 minutes to gel the p.v.c. paste and then allowed to cool.

A sample sheet of the fabric-supported p.v.c. material prepared as above was taken and the p.v.c. surface sprayed with cyclohexanone. Dry, silvered Ballotini, Grade T5 beads as specified for use in Example 1 were then sprayed on to the solvent-tackified surface until a bead-density of 10 was achieved over the whole surface. The cyclohexanone was then removed from the sheet by a current of warm air. The beaded sheet thus produced was placed between two flat polishing plates and the assembly inserted into a press where it was subjected to the pressing conditions as described in Example 1. After removing the pressed sheet from the press, the exposed surfaces of the beads were de-silvered by treating the beaded surface with a chromic acid solution as used in Example 1 the contact time being 30 seconds, care being taken to avoid contact between the acid and the fabric. After treatment, the surface was thoroughly rinsed with water and air dried.

When the beaded surface of the final product was observed from a distance of 3 feet under diffuse illumination, the presence of the beads could not be detected and the sheet appeared black. When the same surface was illuminated by a beam of light in an otherwise dark environment, an observer situated immediately behind the light source, at a distance of 15 feet from the sheet observed the sheet emitting a retro-reflected silver glow which appeared to cover the entire surface.

EXAMPLE 10

Example 9 was repeated up to and including the stage wherein the cyclohexanone is removed from the sheet by a current of warm air.

The beaded sheet thus produced was placed between two flat pressing plates, the surface of that plate in contact with the beaded surface of the sheet bearing an engraving comprising the negative of the pattern illustrated in FIG. 1 the maximum depth of the engraving being 0.007 inch. The assembly was then inserted into a press where it was subjected to the pressing conditions as used in Example 9 above except that, instead of using a pressure of 100 psi, a pressure of 150 psi was used.

After removing the beaded and embossed sheet from the press, the exposed surface of the beads were de-silvered as described in Example 9 above.

A panel cut from the resulting beaded and embossed supported p.v.c. sheet was formed into a 4 inch diameter cylinder with the beaded and embossed surface outermost. A panel cut from a sheet produced according to Example 9 above was formed into a similar cylinder such that the beaded surface was outermost. The two cylinders were illuminated with a beam of light in an otherwise dark environment, and an observer situated immediately behind the light source at a distance of 15 feet from the cylinders observed that a greater proportion of the curved surface of the cylinder prepared from the beaded and embossed sheet could be seen than that of the curved surface of the cylinder prepared from the beaded but unembossed sheet.

EXAMPLE 11

A 5–6 oz raised cotton fabric (Black 7607), as supplied by Carrington and Dewhurst Ltd. was coated continuously on the raised side at a coating weight of 70 gms/square meter, with a natural p.v.c. paste (Grade PCT/60/2761/0000) as supplied by Vinatex Ltd. The thus coated fabric was then sprayed on its coated side with silvered Ballotini Grade T5 beads as used in Example 1 to achieve a bead-density of 10. The thus beaded material was then immediately passed through a 15-feet long hot-air oven having an air temperature of 160° C at a rate of 7.5 feet/minute to gel the p.v.c. paste coating bearing the beads. The resulting beaded material which was cooled and batched was then passed to a rotary embossing machine where the temperature of the sheet was brought to approximately 155° C by passage over polytetrafluoroethylene coated-metal rollers 18 inches in diameter and maintained at approximately 155° C and running at a peripheral speed of 42 feet/minute. The beaded surface of the sheet was then flash-heated by passing the sheet vertically downwards with the beaded surface of the sheet facing towards an infra-red heater spaced at a distance of 8 inches and comprising a bank of radiant elements arranged to give a heater rating of 1 Kw/50 square inches. The sheet was then passed vertically downwards into an embossing nip comprising a water-cooled embossing roller of diameter 5 inches and a rubber back-up roller of diameter 5 inches with the beaded surface of the sheet in contact with the embossing roller. The thus produced fabric supported, beaded embossed p.v.c. sheet was then cooled and batched. The embossing roller was engraved with a negative of the design illustrated in FIG. 1 such that the maximum depth of the engraving was 0.007 inch.

When the beaded and embossed material produced in the after de-silvering as described in Example 9, manner described above was compared with a beaded and un-embossed material, produced according to Example 9, in the way described in Example 10 above, the proportion of the curved surface of the cylinder derived from the beaded and embossed material which was easily visible under the conditions of test was greater than that of the cylinder derived from the un-embossed material.

We claim:

1. A process for making a retro-reflective material which comprises uniformly distributing in a mono-layer over an area on the surface of a generally planar matrix of embossable plastics material, a plurality of substantialy spherical beads prepared from a transparent or translucent material having a refractive index in the range of 1.7 to 2.0 to form a beaded area on the surface of the matrix, pressing said beads into said beaded area until said bends become partially embedded in the surface of said matrix with exposed portions of the beads defining lenses, and embossing said beaded area so that axes of at least some of said lenses lie at varying angles with respect to the general plane of said plastics matrix.

2. A process as claimed in claim 1, wherein the beads are glass beads.

3. A process as claimed in claim 1, wherein the refractive index of the material of the beads is approximately 1.9.

4. A process as claimed in claim 1, wherein the plastics matrix is flexible polyvinyl chloride.

5. A process as claimed in claim 1, wherein the plastics matrix is laminated to a substrate.

6. A process as claimed in claim 1, wherein the beads are embedded in the plastics matrix to a depth substantially equal to the diameter of the beads and a window is left above each bead to allow direct access of light to the bead.

7. A process as claimed in claim 1, wherein the beaded and embossed area of the surface of the plastics matrix comprises from 5 to 95% of the total area of the surface.

8. A process as claimed in claim 1, wherein the bead density is at least 2 beads per square millimeter of surface over the beaded area.

9. A process as claimed in claim 1, wherein the embossing is such that when the beaded and embossed area is illumintated with a parallel beam of light incident at some angle in the range of 35° to 80° to the normal to the plane of that area, the relative intensity of the retro-reflected light calculated as a percentage of the intensity of the retro-reflected light when the incident light is normal to the plane of the embossed area, is increased compared with the relative intensity obtained in the same way for a similar retro-reflective material prepared using the same plastics matrix material but for which the area on the surface containing embedded beads has no superimposed embossing.

10. A process as claimed in claim 9, wherein the embossing is such that the increase in relative intensity is apparent at some angle in the range of 53° to 80°.

11. A process as claimed in claim 1, wherein the embedding of the beads and the embossing of the beaded area is carried out simultaneously.

12. A process as claimed in claim 1, wherein the embedding and embossing is carried out using an embossing roller, an embossing platen or an embossing plate.

13. A process as claimed in claim 1 wherein the plastics matrix beans printed indicia on its surface and the beaded area extends over at least a portion of the indicia.

14. A process as claimed in claim 1 including coating the beaded and embossed surface with a transparent or translucent protective coating which does not significantly affect the retro-reflective properties of the material.

15. A process as claimed in claim 1, wherein the bead diameter is not greater than 0.03 inch.

16. A process as claimed in claim 3, wherein the bead diameter is not greater than 0.006 inch.

17. A process as claimed in claim 1, wherein the portion of the surface of at least some of the beads which is embedded in the plastics matrix is in contact with a reflective layer.

18. A process as claimed in claim 17, wherein the beads are backed by an opaque reflective layer and the bead density is not greater than 95% of the maximum possible bead density for a particular bead diameter.

19. A process as claimed in claim 17, wherein the reflective layer is present only at the interface of a bead and the plastics matrix.

20. A process as claimed in claim 19, wherein the reflective layer is present as a coating on the surface of the bead.

21. A process as claimed in claim 20, wherein the coating is a silver coating.

* * * * *